(12) United States Patent
Gaea

(10) Patent No.: US 7,121,567 B1
(45) Date of Patent: Oct. 17, 2006

(54) BICYCLE HAVING FRONT AND REAR ROTATIVE WHEEL FRAMES WITH ACTUATABLE MEANS FOR ENGAGING AND DISENGAGING THE REAR WHEEL FRAME ROTATION

(76) Inventor: Albert J Gaea, 2135-C Bannister Pl., Apt. C, Honolulu, HI (US) 96819

( * ) Notice: Subject to any disclaimer, the term of this patent is extended or adjusted under 35 U.S.C. 154(b) by 0 days.

(21) Appl. No.: 11/113,905

(22) Filed: Apr. 25, 2005

(51) Int. Cl.
*B62K 21/00* (2006.01)
(52) U.S. Cl. ..................................... 280/267
(58) Field of Classification Search .............. 280/267, 280/268, 272, 278, 287
See application file for complete search history.

(56) References Cited

U.S. PATENT DOCUMENTS

| | | | |
|---|---|---|---|
| 602,034 A * | 4/1898 | Murphy ..................... | 280/266 |
| 1,584,568 A | 5/1926 | Clark | |
| 2,812,194 A | 11/1957 | Ajero | |
| 3,015,498 A | 1/1962 | Tanaka et al. | |
| 3,801,130 A | 4/1974 | Belden | |
| 4,219,209 A | 8/1980 | Haack | |
| 4,284,288 A | 8/1981 | Fulton | |
| 4,506,902 A | 3/1985 | Maebe | |
| 5,975,551 A | 11/1999 | Montague et al. | |
| 6,102,420 A * | 8/2000 | Hoeksta ..................... | 280/269 |
| 6,135,478 A | 10/2000 | Montague | |
| 6,406,047 B1 | 6/2002 | Sawyer, Jr. | |
| 6,450,519 B1 | 9/2002 | Wang | |

FOREIGN PATENT DOCUMENTS

WO    WO99/03723    1/1999

\* cited by examiner

*Primary Examiner*—Kevin Hurley
(74) *Attorney, Agent, or Firm*—Michael I Kroll

(57) ABSTRACT

A bicycle having a frame with pivotal front and rear wheels with means for engaging and disengaging said pivotal movement on one of the wheels by moving a pivotal strut to engage the rear wheel frame thereby preventing movement of the wheel frame. Moving the actuator to a frame engaging position allows rotation of the rear wheel frame.

8 Claims, 9 Drawing Sheets

BICYCLE HAVING FRONT AND REAR ROTATIVE WHEEL FRAMES WITH ACTUATABLE MEANS FOR ENGAGING AND DISENGAGING THE REAR WHEEL FRAME ROTATION

BACKGROUND OF THE INVENTION

1. Field of the Invention

The present invention relates generally to bicycles and, more specifically, to a bicycle having a frame incorporating means for selectively engaging and disengaging an actuator whereby the rear wheel can be rotated.

The present invention provides a bicycle having a frame with pivotal front and rear wheels with means for engaging and disengaging said pivotal movement on one of the wheels by moving a pivotal strut to engage the rear wheel frame thereby preventing movement of the wheel frame. Moving the actuator to a frame engaging position allows rotation of the rear wheel frame.

2. Description of the Prior Art

There are other frame types designed for bicycles. Typical of these is U.S. Pat. No. 1,584,568 issued to Clark on May 11, 1926.

Another patent was issued to Ajero on Nov. 5, 1957 as U.S. Pat. No. 2,812,194. Yet another U.S. Pat. No. 3,015,498 was issued to Tanaka et al on Jan. 2, 1962 and still yet another was issued on Aug. 18, 1981 to Fulton as U.S. Pat. No. 4,284,288.

Another patent was issued to Belden on U.S. Pat. No. 3,801,130 as U.S. Pat. No. 3,801,130. Yet another U.S. Pat. No. 4,219,209 was issued to Haack on Aug. 26, 1980. Another was issued to Maebe on Mar. 26, 1985 as U.S. Pat. No. 4,506,902 and still yet another was issued on Nov. 2, 1999 to Montague et al. as U.S. Pat. No. 5,975,551.

Another patent was issued to Montague on Oct. 24, 2000 as U.S. Pat. No. 6,135,478. Yet another U.S. Pat. No. 6,406,047 was issued to Sawyer, Jr. on Jun. 18, 2002. Another was issued to Wang on Sep. 17, 2002 as U.S. Pat. No. 6,450,519. Still yet another was issued on Jan. 1, 1897 to Smith as U.K. Patent No. GB 1949 and another was published on Jan. 28, 1999 as International Patent Application No. WO99/03723.

U.S. Pat. No. 1,584,568

Inventor: Charles H. Clark

Issued: May 11, 1926

A bicycle or similar device comprising rear frame to which the rear wheel is connected in the usual way, an upwardly projecting coupling stem rigidly connected to said frame, a front frame to which the front wheel is connected and provided with a sleeve pivotally mounted upon the upper end of said upwardly projecting portion of the stem, and means cooperating with said stem and sleeve for effecting an interlocking engagement between the same.

U.S. Pat. No. 2,812,194

Inventor: Fortunato S. Ajero

Issued: Nov. 5, 1957

In a velocipede, the combination of a frame, a front traction wheel rotatably secured to said frame for steering movement, a pair of rear traction wheels rotatably secured to said frame for steering movement, means for driving at least one of said rear wheels, an angularly movable driving connection between said means and said one rear wheel, primary steering means for said front wheel including a steering member operatively secured to said front wheel and rotatable therewith, auxiliary steering means for said rear wheels including a clutch plate coaxial with said steering member and rotatably mounted relatively thereto, a clutch element pivotally secured to said clutch plate and yieldably engaging said steering member to secure said plate to said steering member for simultaneous rotation therewith, means for selectively disengaging said clutch element from said steering member, and means for locking said clutch plate in a predetermined position of angularity in response to said disengagement.

U.S. Pat. No. 3,015,498

Inventor: Shoji Tanaka et al

Issued: Jan. 2, 1962

A folding bicycle comprising front, center and rear frame assemblies, a handle bar mechanism on the front assembly, a seat post and pedal driven mechanism on the rear assembly, hinge members connecting respective pairs of said assemblies; each hinge member comprising: upper and lower hinge plates on one of the assemblies of one of the pairs, said plates being provided with engaging slots at one side thereof, a stud supported on a side of the other assembly of said one pair of pivotally supported on said plates at the other side of the latter, a locking rod rotatably supported on said other assembly on the other side of the latter, said rod including sections of reduced dimension to enter said slots and engage therein, and tightening means for fixing said rod to said plates.

U.S. Pat. No. 3,801,130

Inventor: Ralph A. Beldon

Issued: Apr. 2, 1974

A two wheeled, rider propelled vehicle having both wheels pivotably mounted upon a medial principal frame. The pivotable rear wheel frame supports pedal mechanism propelling the rear wheel and may be steered by the feet of the user. Mechanical biasing means communicate between the pivotable rear wheel frame and mainframe to bias motion and a latching mechanism allows fixed positioning of the two members. A vertically adjustable seat is fixedly carried by the principal frame and the forward portion of the vehicle provides a traditional manually steerable, pivotably mounted front wheel frame.

U.S. Pat. No. 4,284,288

Inventor: Roger G. Fulton

Issued: Aug. 18, 1981

A portable folding bicycle for compact storage in a folded position utilizes a main frame having front and rear frame sections supporting front and rear wheels and hinged together for folding and positioning the wheels into compact side-by-side relationship. A seat structure is removably attached to the rear frame section and power transmission members such as crank assemblies, sprockets and a drive chain extend between the rear frame section and the rear wheel for causing powered rotation. The front frame section has at least one frame member defining a receptacle for receipt of the front wheel upon folding, and a steering assembly affixed thereto and including upper and lower end portions. A front fork assembly is foldably mounted to the steering assembly and has at least one fork member rotatably supporting the front wheel and a connecting hinge attaching the front fork member to the lower end portion of the steering assembly for rearward and upward folding of the front fork member and the front wheel whereby the front wheel is received into the receptacle for compact storage when the bicycle is folded. A handle bar assembly is connected to the front fork member and is collapsible relative thereto.

U.S. Pat. No. 4,219,209

Inventor: Frank P. Haack

Issued: Aug. 26, 1980

A bicycle with an articulated frame is described for novelty riding use. A rider may manipulate a clutch while riding the bicycle to cause restraint to be removed from a joint joining front and rear frame portions of the bicycle and maneuver in such a way as to cause the two frame portions to be angularly aligned.

U.S. Pat. No. 4,506,902

Inventor: Richard M. Maebe

Issued: Mar. 26, 1985

A bicycle comprises front and rear wheel assemblies which are independently steerable. The rear wheel assembly includes a pedal crank which is mounted on the axle of the rear tire. A rear fork holds the rear axle and includes a shaft which is rotatably coupled to a rear portion of the bicycle frame. A saddle is mounted to the top of the shaft of the rear fork. Turning the saddle and/or the pedal crank laterally rotates the rear wheel assembly independently of the front wheel assembly. The front wheel assembly similarly includes a fork which holds the axle of the front tire. A shaft portion of the fork is rotatably coupled to a front portion of the bicycle frame and is coupled to a handlebar. Turning the handlebar rotates the front wheel assembly independently of the rear wheel assembly. The frame retains the front and rear wheel assemblies in a plane which is substantially perpendicular to the plane in which the bicycle is ridden to provide a greater degree of stability and to facilitate the independent steering of the front and rear wheel assemblies.

U.S. Pat. No. 5,975,551

Inventor: David G. Montague et al

Issued: Nov. 2, 1999

A foldable bicycle designed so when the bicycle is folded, the front and rear frames bypass each other (non-overlapping) to permit a complete folding position and using a fold on or near the seat tube, and to maintain a rigid open riding position with simple standard fold restraining devices.

U.S. Pat. No. 6,135,478

Inventor: Harry D. Montague

Issued: Oct. 24, 2000

A foldable bicycle comprises a front frame (1), a rear frame (21), and a seat tube (20). The front frame (1) and the rear frame (21) are foldable with respect to each other. In a first aspect, a single release clamp (12) releases the front frame from the rear frame in a single operation. This occurs by having the seat tube (20) slotted at the top (11). In a second aspect, the crank housing (34) is positioned in axial alignment with the seat tube (20) and one point (14) of folding occur below the crank housing. This aspect pertains to both a men's and a women's frame.

U.S. Pat. No. 6,406,047

Inventor: Thomas Kidder Sawyer, Jr.

Issued: Jun. 18, 2002

A bicycle having a front and rear wheel geared capability. A bicycle having both front and rear wheel gear controlled and chain driven. A bicycle frame where the front and rear halves pivot on a vertical center section. A steering mechanism that is controlled by the front handlebar that rotates a gear that is meshed with notches on the front end of the steering cable assembly. A center double sprocket system that is connected to drive gears on the front and rear axles by a fixed bar with pivot capabilities, and are chain driven.

U.S. Pat. No. 6,450,519

Inventor: Ping Tien Wang

Issued: Sep. 17, 2002

A waist-twisting leisure bike includes a front body frame, a rear body frame, and a lateral frame. The front body frame has a handle, a support rod, a front fork tube, a front fork base, a front fork and a front wheel. The rear body frame has a driving device, a seat and a rear wheel. The lateral frame consists of a first and a second lateral frame respectively connected to the front body frame and the rear body frame. The first and the second lateral frame are pivotally connected to each other. Then a rider can twist the waist for changing swaying angle of the first and the second lateral frame so as to change the moving direction of the bike. So the bike in the invention can move by pedaling but also be used for waist-twisting exercise as well.

U.K. Patent Number GB 1949

Inventor: William Borthwick Smith

Issued: Jan. 1, 1898

The invention discloses a triangular frame consisting of two inclined tubular sides c and f connected by a more or less horizontal tubular bottom g, the side of c having a steering bar passing through it, a fork at the lower end of the steering bar carrying the steering wheel a, and a fork at the lower end of side f carrying the driving wheel d, the two inclined sides International Patent Application Number
WO99/03723

Inventor: David G. Montague et al

Published: Jan. 28, 1999

A foldable bicycle designed so when the bicycle is folded, the front (1) and rear (2) frames bypass each other to permit a complete folding position and using a fold on or near the seat tube (7), and to maintain a rigid open riding position with simple standard fold restraining devices.

While these bicycles may be suitable for the purposes for which they were designed, they would not be as suitable for the purposes of the present invention, as hereinafter described.

SUMMARY OF THE PRESENT INVENTION

A primary object of the present invention is to provide a bicycle having a frame providing means for selectively engaging two rotative wheels.

Another object of the present invention is to provide a bicycle having means for disengaging selective rotation of one of the wheel members.

Yet another object of the present invention is to provide a bicycle having a frame incorporating an actuator as means for engaging and disengaging rotation of the rear wheel.

Still yet another object of the present invention is to provide a bicycle wherein said actuator is pivotably attached to said frame.

Another object of the present invention is to provide a bicycle wherein said actuator engages the rear wheel frame thereby preventing rotation.

Additional objects of the present invention will appear as the description proceeds.

The present invention overcomes the shortcomings of the prior art by providing a bicycle having a frame incorporating means for selectively engaging and disengaging an actuator whereby the rear wheel can be rotated.

The present invention provides a bicycle having a frame with pivotal front and rear wheels with means for engaging and disengaging said pivotal movement on the rear wheel by moving a pivotal strut to engage the rear wheel frame thereby preventing movement of the wheel frame. Moving the actuator to a frame engaging position allows rotation of the rear wheel frame.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
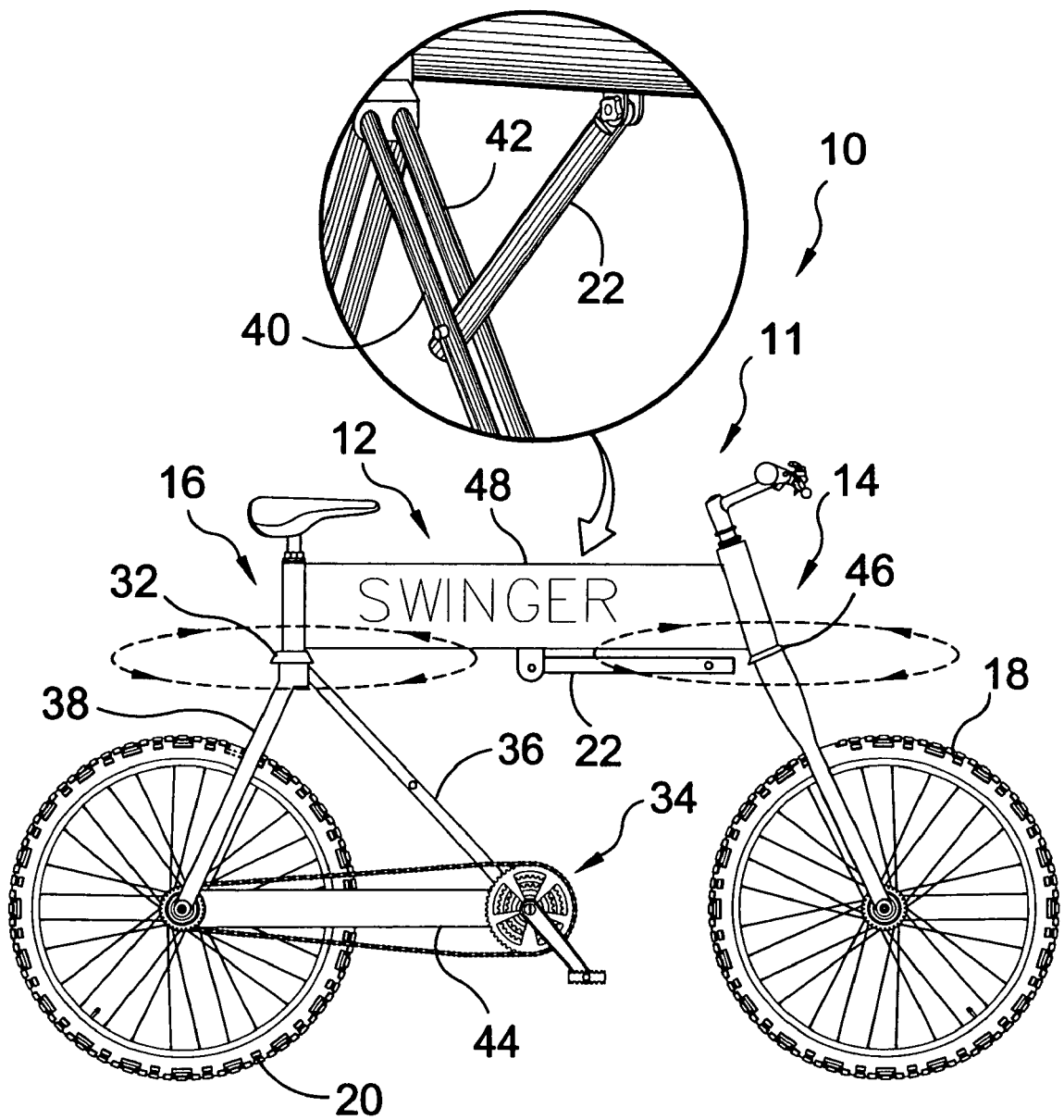
FIG. 1 is an illustrative view of the present invention.

Turning now descriptively to the drawings, in which similar reference characters denote similar elements throughout the several views, the figures illustrate the Bicycle with a Selectively Pivotable Rear Wheel Assembly of the present invention. With regard to the reference numerals used, the following numbering is used throughout the various drawing figures.

10 Bicycle with a Selectively Pivotable Rear Wheel Assembly
12 frame
14 front wheel assembly
16 rear wheel assembly
18 front wheel
20 rear wheel
22 pivotal actuator strut
24 actuator mounting bracket
26 actuator locking knob
28 threaded bolt of 26
30 frame of 16
32 rear wheel assembly pivot means
34 pedal assembly of 16
36 bifurcated tubular frame to 34
38 bifurcated tubular frame to 20
40 first bifurcated member of 36
42 second bifurcated member of 36
44 horizontal member of 16
46 front wheel assembly pivot means
48 connector frame member
50 locking pin
52 locking pin recess

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention. The present invention is 10 a bicycle 11 having a frame 12 with a pivotal front wheel assembly 14 having a front wheel 18 associated therewith and a pivotal rear wheel assembly 16 having a rear wheel 20. A connector frame member 48 joins the front wheel assembly 14 to the rear wheel assembly 16 and has a rear wheel assembly pivot means 32 on a first end and a front wheel assembly pivot means 46 on a second end. The rear wheel assembly 16 includes a pair of bifurcated tubular frames 36,38 extending angularly away from each other from the rear wheel assembly pivot means 32 with the distal ends thereof connected to and stabilized by a horizontal member 44. A pivoting actuator strut 22 is disposed on the underside of the connector frame member 48 and is selectively positioned by the user to either lock or unlock the rear assembly 16 by either locking it in place parallel to the connector frame member 48 to allow the rear wheel assembly 16 to pivot or by rotating and securing it between the two bifurcated members 40,42 leading to the pedal assembly 34.

Figure 2:
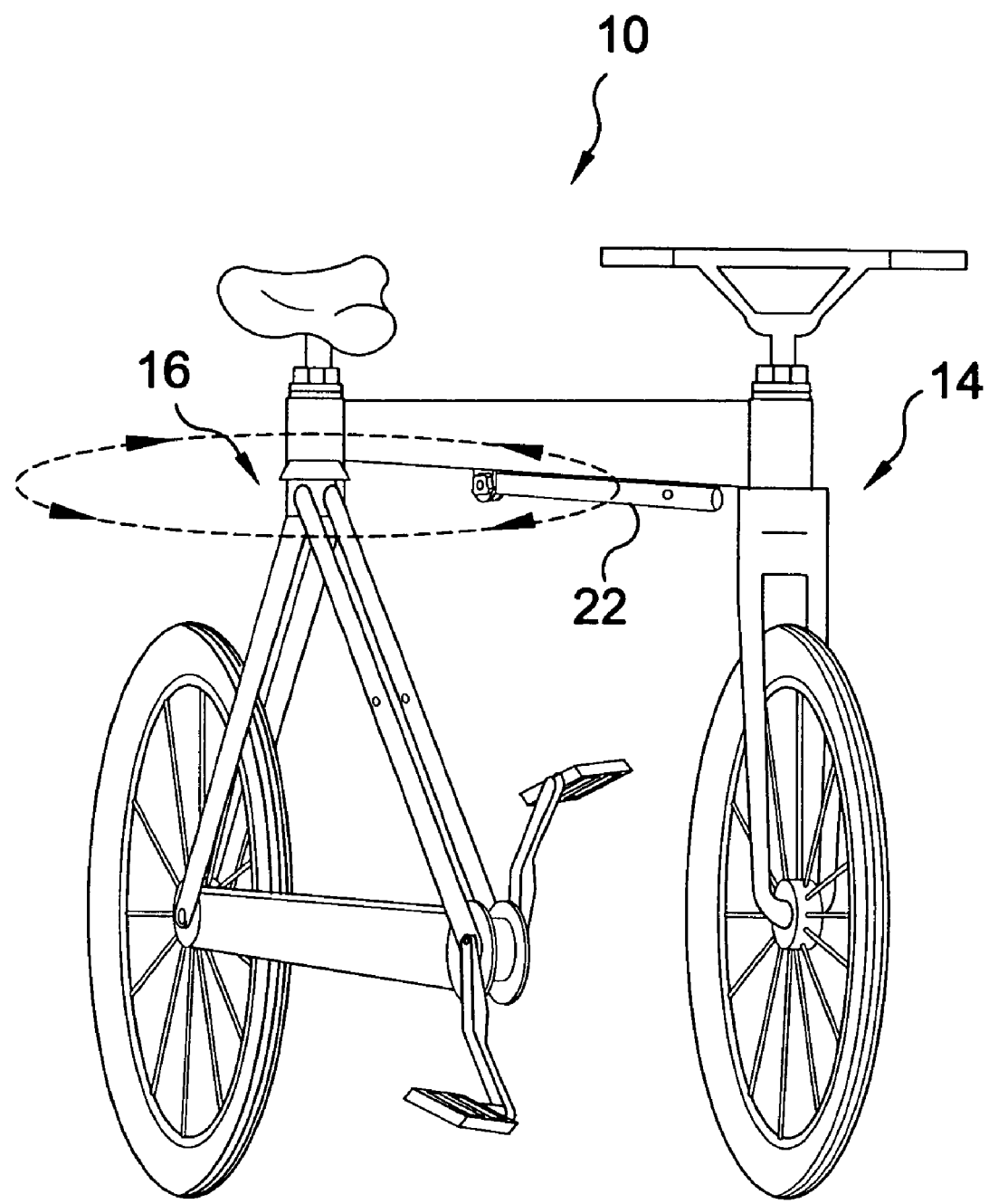
FIG. 2 is a perspective view of the present invention in an unlocked position.

FIG. 2 is a perspective view of the present invention 10 in an unlocked position. Shown is the present invention 10 having the actuator strut 22 in an unlocked position allowing the rear wheel assembly 16 to work independently from the front wheel assembly 14.

Figure 3:
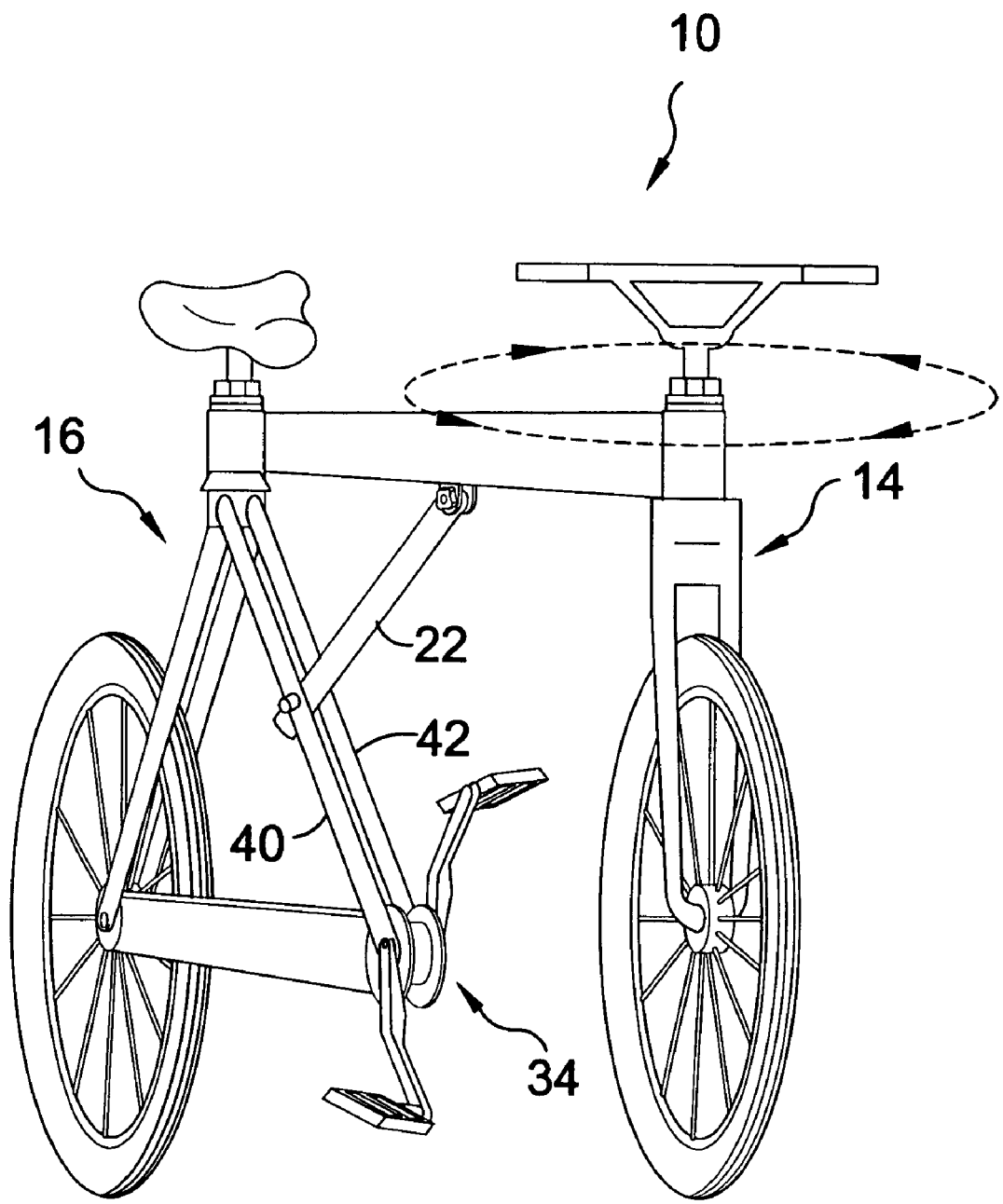
FIG. 3 is a perspective view of the present invention in a locked position.

FIG. 3 is a perspective view of the present invention 10 in a locked position. Shown is the present invention 10 having the actuator strut 22 in a locked position between the twin bifurcations 40,42 leading to the pedal assembly 34 preventing the rear wheel assembly 16 from working independently from the front wheel assembly 14.

Figure 4:
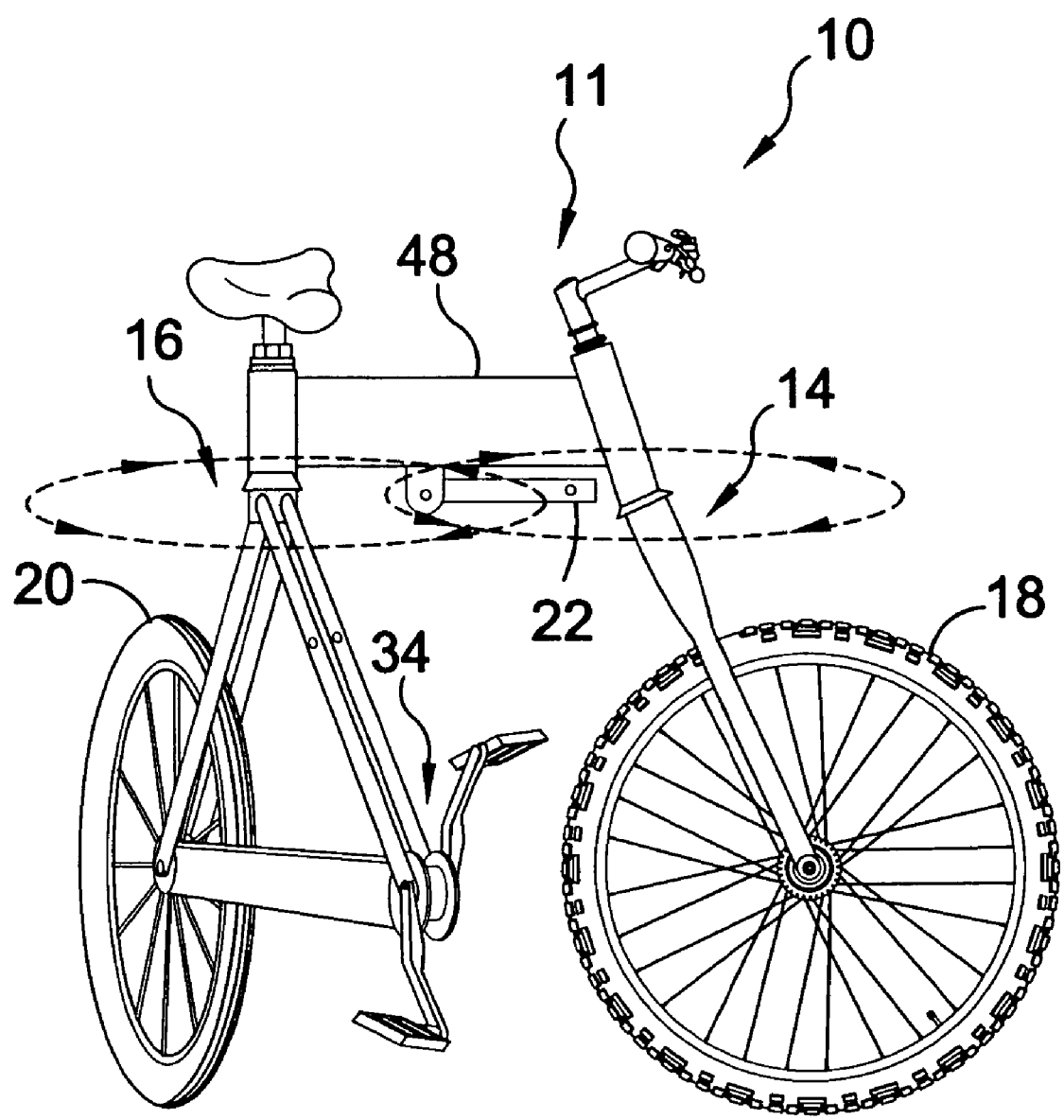
FIG. 4 is a perspective view of the present invention in an unlocked position.

FIG. 4 is a perspective view of the present invention 10 in an unlocked position. Shown is the present invention 10, a two-wheeled rider-propelled bicycle 11 having both wheels 18,20 pivotably mounted upon their respective assembly's 14,16. The pivotable rear wheel assembly 16 supports a pedal assembly 34 propelling the rear wheel 20 and may be steered by the feet of the user. An actuator strut 22 communicates between the pivotable rear wheel assembly 16 and the connector frame 48 to bias motion, allowing fixed positioning of the two members.

Figure 5:
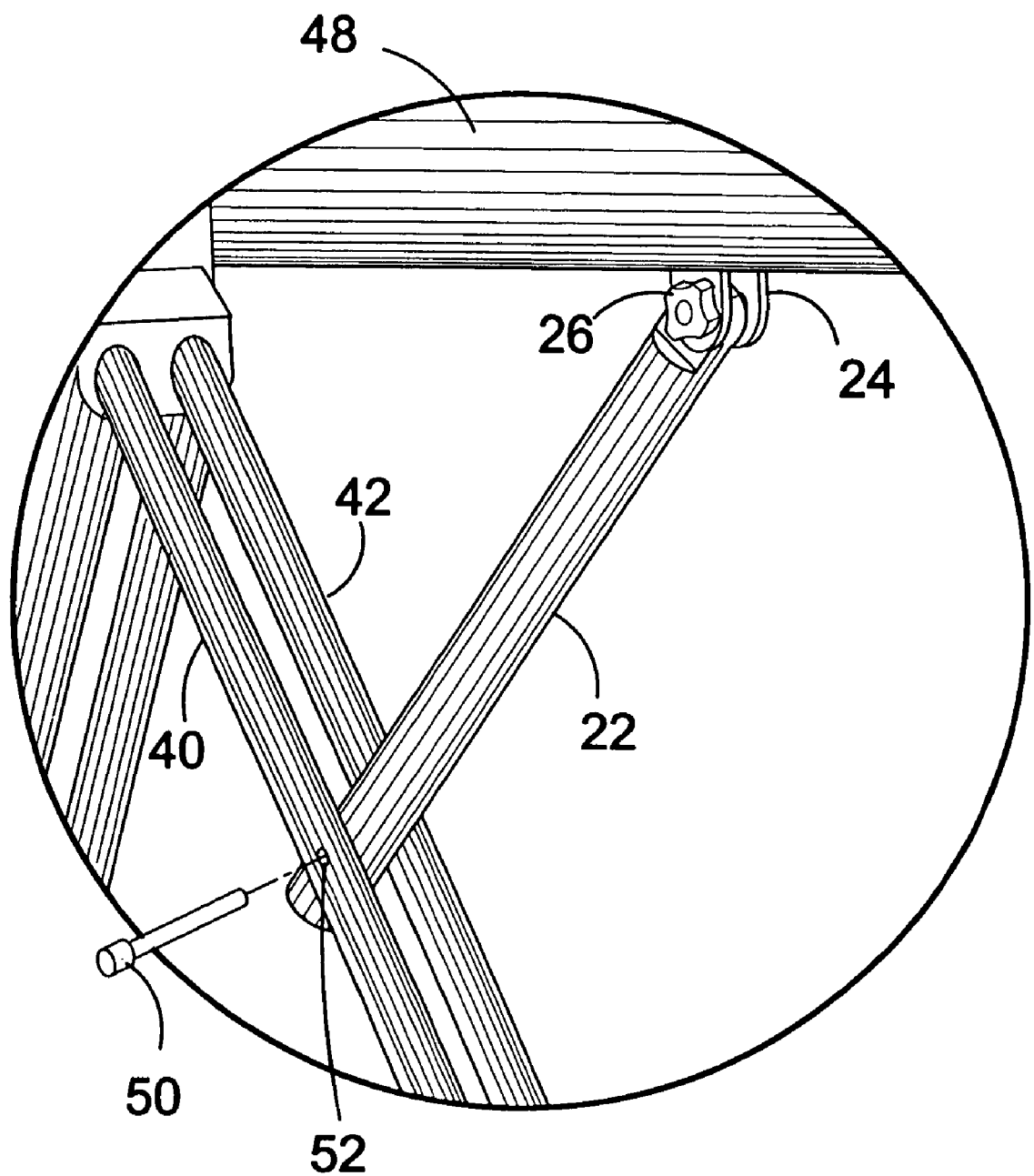
FIG. 5 is a detailed view of the actuator of the present invention in a locked position.

FIG. 5 is a detailed view of the actuator strut 22 of the present invention having the actuator strut 22 in a locked position between the twin bifurcations 40,42 preventing the rear wheel from working independently from the front wheel. The actuator strut 22 is mounted to the connector frame 48 by a mounting bracket 24 and a locking knob 26 and the distal end of the actuator strut 22 is maintained in position by a locking pin 50 that is inserted through corresponding recesses 52 in actuator strut 22 and the first 40 and second 42 bifurcations.

Figure 6:
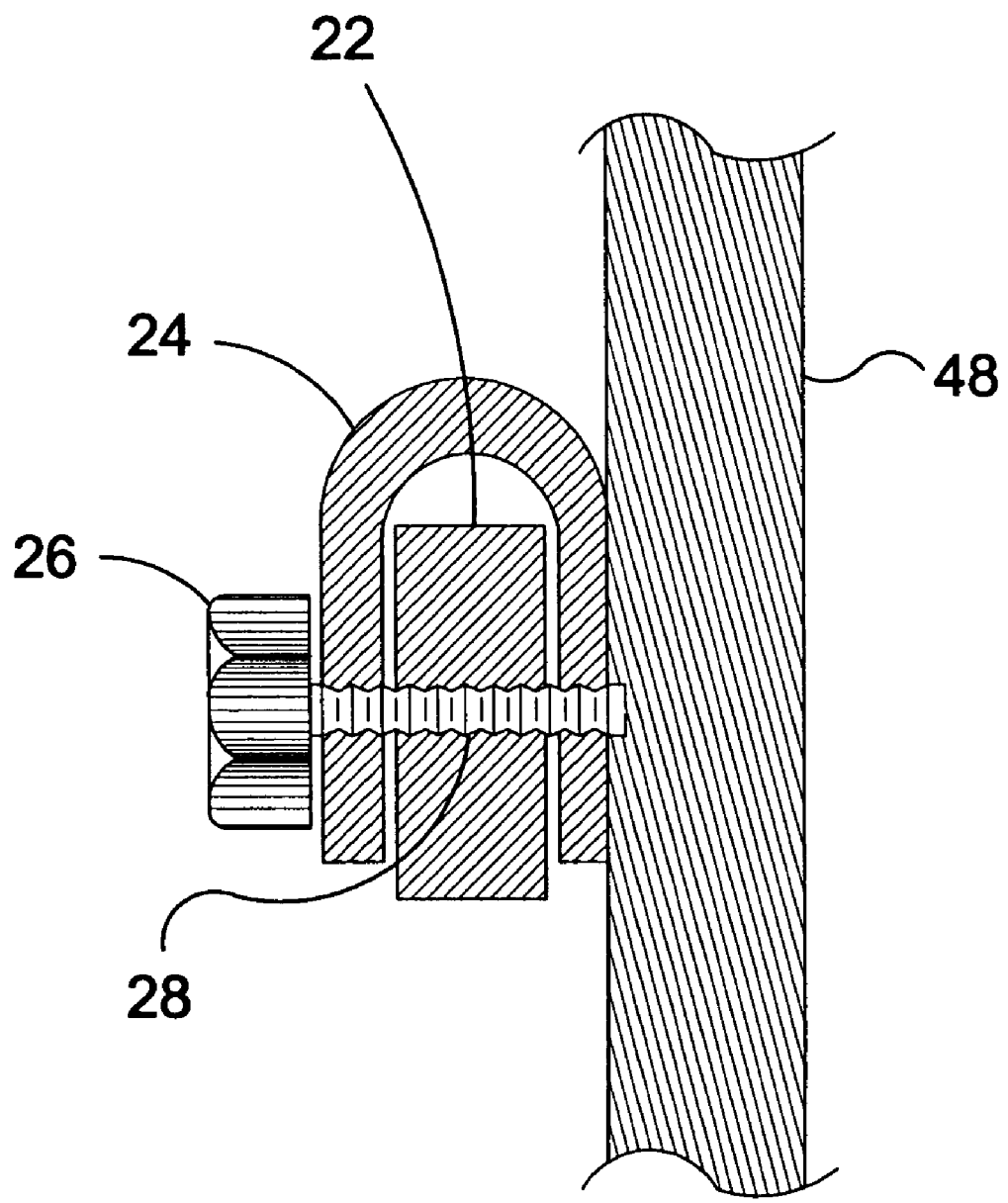
FIG. 6 is a sectional view of the actuator of the present invention in an unlocked position.

FIG. 6 is a sectional view of the actuator strut 22 of the present invention in an unlocked position allowing the rear wheel to work independently from the front wheel. The actuator strut 22 is mounted to the connector frame 48 by means of a mounting bracket 24 and locks positions by means of a locking knob 26 with a threaded bolt 28 extending therefrom.

Figure 7:
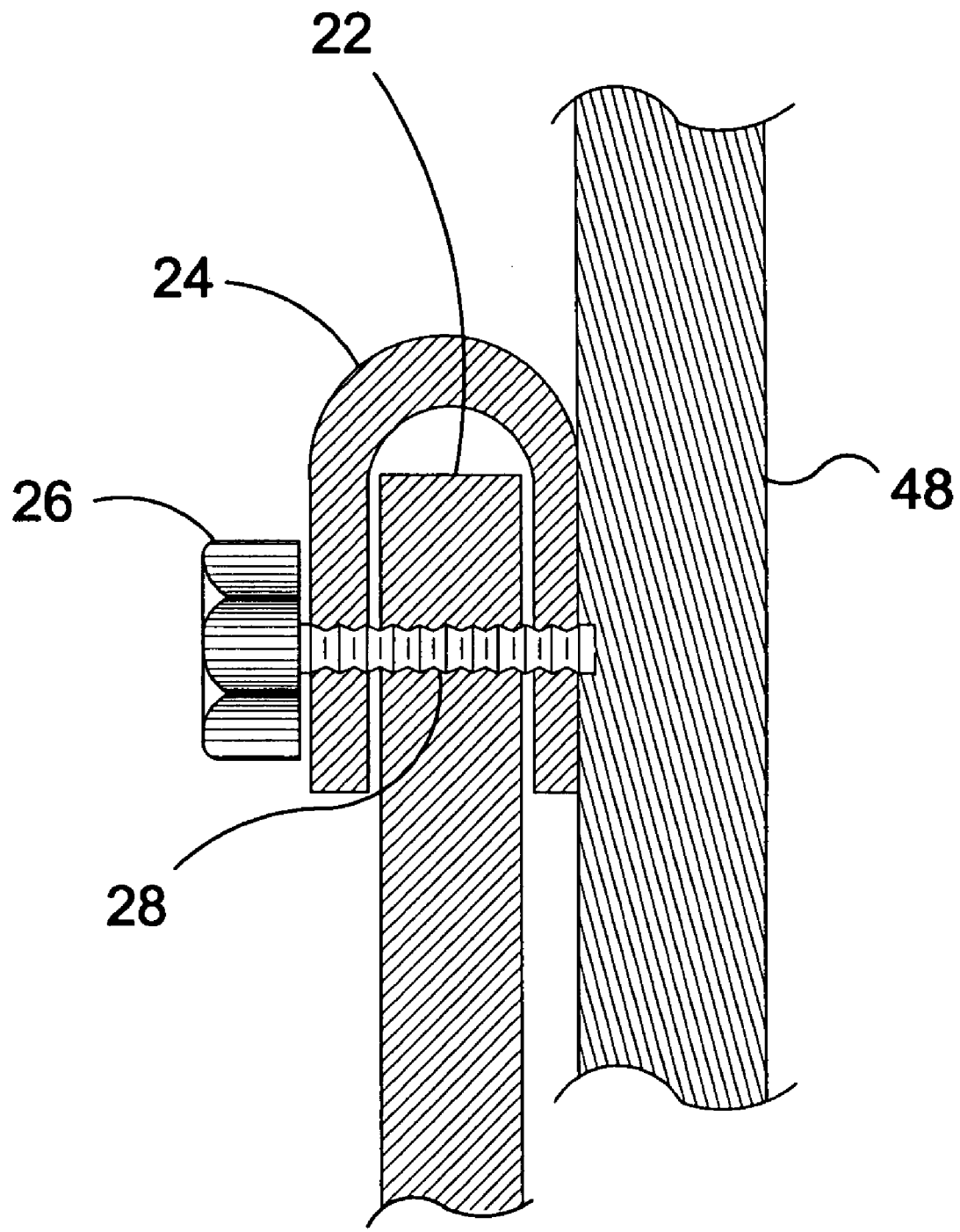
FIG. 7 is a sectional view of the actuator of the present invention in a locked position.

FIG. 7 is a sectional view of the actuator strut 22 of the present invention in a locked position preventing the rear wheel from working independently from the front wheel. The actuator strut 22 is mounted to the connector frame 48 by means of a mounting bracket 24 and locks positions by means of a locking knob 26 with a threaded bolt 28 extending therefrom.

Figure 8:
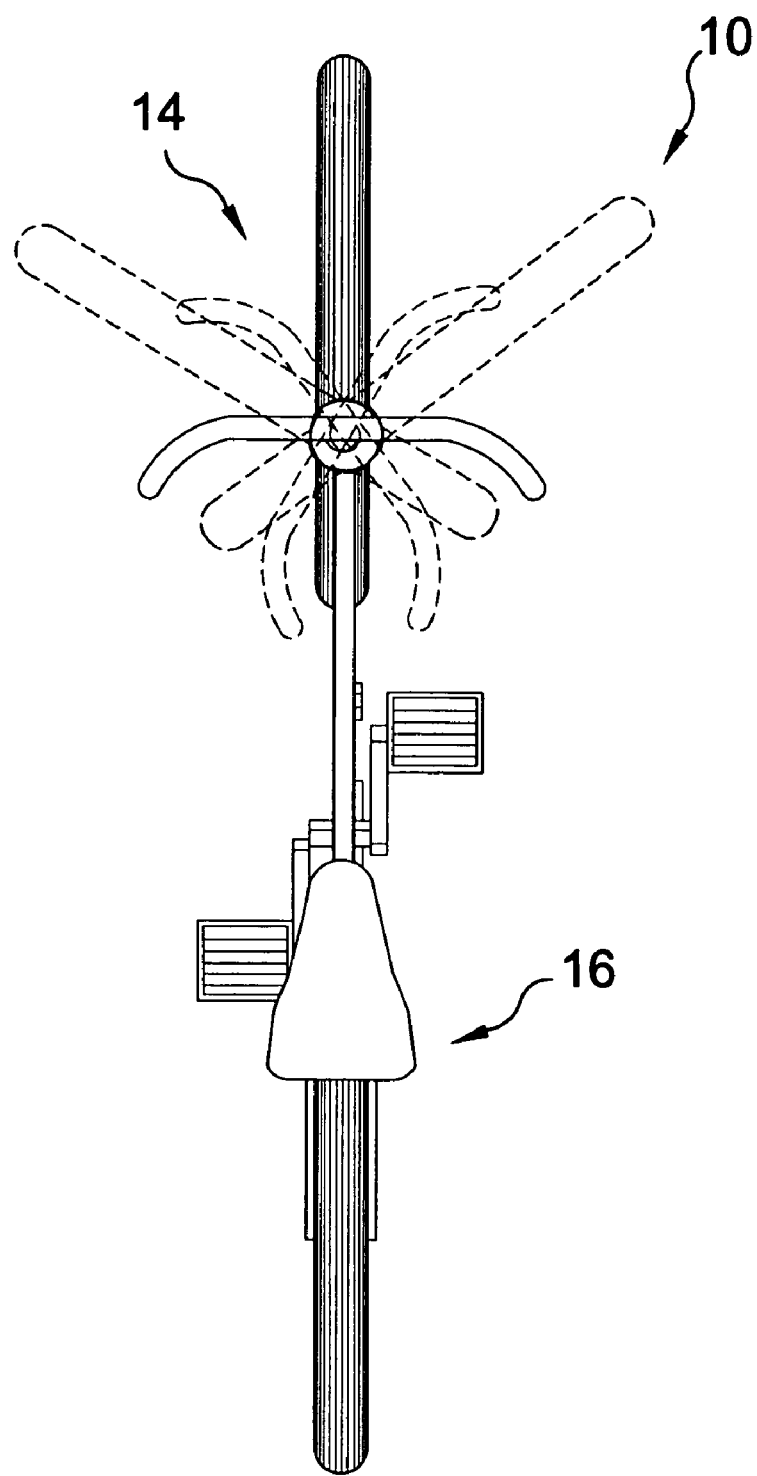
FIG. 8 is a top view of the bicycle of the present invention having the actuator in a locked position.

FIG. 8 is a top view of the bicycle of the present invention 10 having the actuator in a locked position preventing the rear wheel assembly 16 from working independently from the front wheel assembly 14.

Figure 9:
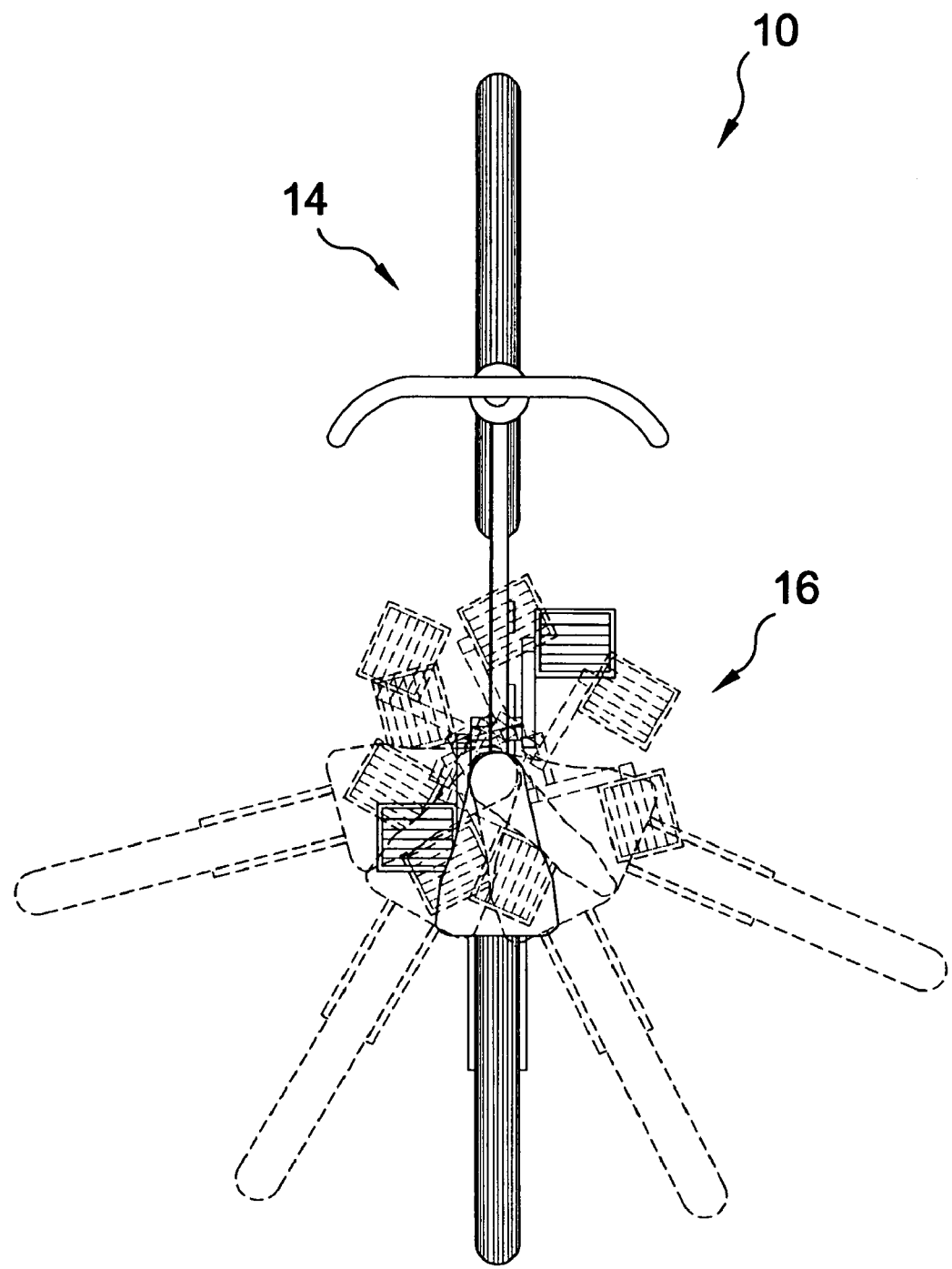
FIG. 9 is a top view of the present invention with actuator in an unlocked position.

FIG. 9 is a top view of the present invention 10 with actuator in an unlocked position allowing the rear wheel assembly 16 to work independently from the front wheel assembly 14.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A bicycle with a selectively pivotable rear wheel comprising:
   a) a rear wheel assembly including a rear wheel and a pedal assembly;
   b) a front wheel assembly including a front wheel;
   c) a connector frame member having a first end with a pivot means for retaining said rear wheel assembly thereto and a second end having a pivot means for retaining said front wheel assembly thereto; and
   d) means for selectively engaging and disengaging said pivotability of said rear wheel assembly, wherein said rear wheel assembly further comprises a first bifurcated frame element extending angularly downward and rearwardly from pivot means to said rear wheel and second bifurcated frame element extending angularly downward and medially to said pedal assembly with a horizontal frame member communicating between the distal ends thereof to form a stable A-frame assembly, said bifurcated frame element comprises a first bifurcated member and a parallel spaced-apart second bifurcated element and said means for selectively engaging and disengaging said pivotability of said rear wheel assembly is an actuator strut pivotally disposed on the underside of said connector frame member and sized substantially to fit between said first bifurcated element and said second bifurcated element.

2. A bicycle with a selectively pivotable rear wheel as recited in claim 1, wherein said actuator strut prevents said rear wheel assembly from pivoting when the distal end thereof is positioned within the gap between said first bifurcated member and said second bifurcated member and secured thereto.

3. A bicycle with a selectively pivotable rear wheel as recited in claim 1, wherein said actuator strut is mounted to said connector frame member with a mounting bracket and locking knob.

4. A bicycle with a selectively pivotable rear wheel as recited in claim 3, wherein said rear wheel assembly is unlocked when said actuator strut is removed therefrom and pivoted into a position parallel to said connector frame member.

5. A bicycle with a selectively pivotable rear wheel as recited in claim 4, wherein said actuator strut is retained in the parallel position to said connector frame element by tightening said locking nut.

6. A bicycle with a selectively pivotable rear wheel as recited in claim 2, wherein said distal end of said actuator strut is secured to said first bifurcated member and said second bifurcated member by means of a locking pin that is inserted into corresponding recesses in said first bifurcated member and said second bifurcated member.

7. A bicycle with a selectively pivotable rear wheel as recited in claim 1, wherein said first bifurcated element and second bifurcated element are fabricated of a tubular material.

8. A bicycle with a selectively pivotable rear wheel as recited in claim 1, wherein having said rear wheel assembly unlocked provides the rider with greater maneuverability due to the ability of having said front wheel assembly and said second wheel assembly pivot independently of one another.

* * * * *